US010476365B2

(12) United States Patent
Murase et al.

(10) Patent No.: US 10,476,365 B2
(45) Date of Patent: Nov. 12, 2019

(54) ROTARY MACHINE

(71) Applicants: KAWASAKI JUKOGYO KABUSHIKI KAISHA, Kobe-shi, Hyogo (JP); NATIONAL UNIVERSITY CORPORATION TOKYO UNIVERSITY OF MARINE SCIENCE AND TECHNOLOGY, Tokyo (JP)

(72) Inventors: Yohei Murase, Kobe (JP); Etsuya Yanase, Kobe (JP); Toshiyuki Yanamoto, Kobe (JP); Mitsuru Izumi, Tokyo (JP); Motohiro Miki, Tokyo (JP); Kota Yamaguchi, Tokyo (JP)

(73) Assignees: KAWASAKI JUKOGYO KABUSHIKI KAISHA, Kobe (JP); NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 15/757,591

(22) PCT Filed: Aug. 2, 2016

(86) PCT No.: PCT/JP2016/003565
§ 371 (c)(1),
(2) Date: Mar. 5, 2018

(87) PCT Pub. No.: WO2017/038004
PCT Pub. Date: Mar. 9, 2017

(65) Prior Publication Data
US 2019/0036438 A1     Jan. 31, 2019

(30) Foreign Application Priority Data
Sep. 2, 2015   (JP) .................. 2015-172528

(51) Int. Cl.
*H02K 55/04* (2006.01)
*H02K 9/19* (2006.01)
(Continued)

(52) U.S. Cl.
CPC ............... *H02K 55/04* (2013.01); *H02K 1/32* (2013.01); *H02K 9/19* (2013.01); *H02K 9/20* (2013.01); *Y02E 40/625* (2013.01)

(58) Field of Classification Search
CPC ............ H02K 55/04; H02K 1/32; H02K 9/19; H02K 9/20; Y02E 40/265
(Continued)

(56) References Cited

U.S. PATENT DOCUMENTS

| 4,267,474 A | 5/1981 | Bounds |
| 4,315,172 A | 2/1982 | Intichar et al. |
| 2018/0041105 A1 | 2/2018 | Bauer et al. |

FOREIGN PATENT DOCUMENTS

| CA | 2429283 A1 | 5/2002 |
| DE | 2530100 A1 | 2/1977 |

(Continued)

OTHER PUBLICATIONS

Oct. 11, 2016 International Search Report issued in International Patent Application No. PCT/JP2016/003565.

Primary Examiner — Terrance L Kenerly
(74) Attorney, Agent, or Firm — Oliff PLC

(57) ABSTRACT

Provided is a rotary machine capable of increasing cooling efficiency while preventing an increase in the weight and cost of a rotor even in a case where the diameter of the rotor is increased. A rotary machine including a rotor which is rotatable around a rotational axis, and a cooling device, wherein the rotor includes: a hollow cooling medium flow section provided in a center portion of the rotor in a radial direction and extending along the rotational axis; and a (Continued)

cooling target provided outward of the cooling medium flow section in the radial direction, and the rotary machine comprises a stationary section pipe which introduces a liquid phase cooling medium generated by cooling in the cooling device into the cooling medium flow section, and returns a gas phase cooling medium present in an inside of the cooling medium flow section from the cooling medium flow section toward the cooling device, the rotor including: a leading passage which leads the liquid phase cooling medium to a region which is in the vicinity of the cooling target through a first opening formed in a side surface of the cooling medium flow section, the side surface extending along the rotational axis; and a return passage which returns the gas phase cooling medium to the inside of the cooling medium flow section, the gas phase cooling medium being generated by evaporation of the liquid phase cooling medium in the region which is in the vicinity of the cooling target, by heat exchange between the liquid phase cooling medium and the cooling target.

6 Claims, 4 Drawing Sheets

(51) Int. Cl.
  *H02K 1/32* (2006.01)
  *H02K 9/20* (2006.01)

(58) Field of Classification Search
  USPC .......................................................... 310/54
  See application file for complete search history.

(56) References Cited

FOREIGN PATENT DOCUMENTS

| | | | | |
|---|---|---|---|---|
| JP | S57-028540 A | | 2/1982 | |
| JP | H04-00256 A | | 1/1992 | |
| JP | 3799016 B2 | | 7/2006 | |
| JP | WO2013128813 | * | 9/2013 | ............ H02K 55/04 |
| WO | 2016/119968 A1 | | 8/2016 | |

* cited by examiner

ROTARY MACHINE

TECHNICAL FIELD

The present invention relates to a rotary machine.

BACKGROUND ART

Conventionally, as an exemplary cooling device for cooling a cooling target (target to be cooled) such as superconducting field poles of a superconducting rotary machine, for the purpose of, for example, keeping the cooling target in a superconductive state, a rotary machine having a cooling structure for cooling the cooling target with latent heat generated by evaporation of a liquid phase cooling medium, by a thermosiphon method and/or a heat pipe method, etc., is known. The following Patent Literature 1 discloses a rotary machine in which a cooling medium (liquid phase cooling medium) generated by condensation in a condenser cooled by a cooling device is delivered to a central hollow space formed inside a rotor of the rotary machine through a coupling pipe, and the liquid phase cooling medium is evaporated into a gas phase cooling medium in the central hollow space to cool windings (cooling target) wound around a winding holder provided to surround the central hollow space via the winding holder. In this rotary machine, the gas phase cooling medium generated by evaporation of the liquid phase cooling medium, inside the central hollow space, is returned to the condenser through the same coupling pipe, cooled and condensed again into the liquid phase cooling medium.

CITATION LIST

Patent Literature

Patent Literature 1: Japanese Patent No. 3799016 Publication

SUMMARY OF INVENTION

Technical Problem

In the rotary machine disclosed in Patent Literature 1, the windings (cooling target) are cooled by heat conduction (transfer) via the winding holder. Therefore, if the diameter of the rotor of the rotary machine is increased, the whole of the winding holder serving as a heat conduction section is required to have a solid structure entirely in a radial direction, from the central hollow space to the cooling target, or it is necessary to connect the central hollow space and the cooling target to each other by a heat transfer structure. For this reason, the weight of the cooling structure including the winding holder is increased, which increases material cost and manufacturing cost of the rotary machine.

Regarding the cooling capability of the cooling device, higher cooling efficiency can be obtained, in a case where a temperature difference between a cold head of the cooling device and the cooling target is less. In the above-described configuration, since a heat transfer structure (heat conduction path) formed between the cold head of the cooling device and the cooling target is long, a temperature difference between the cooling device and the cooling target is generated. As a result, the cooling efficiency cannot be increased.

The present invention has been developed to solve the above-described problems, and an object of the present invention is to provide a rotary machine which can increase cooling efficiency while preventing an increase in the weight and cost of a rotor, even in a case where the diameter of the rotor is increased.

Solution to Problem

An aspect of the present invention provides a rotary machine including a rotor which is rotatable around a rotational axis, and a cooling device, wherein the rotor includes: a hollow cooling medium flow section provided in a center portion of the rotor in a radial direction and extending along the rotational axis; and a cooling target provided outward of the cooling medium flow section in the radial direction, the rotary machine comprising: a stationary section pipe which introduces a liquid phase cooling medium generated by cooling in the cooling device into the cooling medium flow section, and returns a gas phase cooling medium present in an inside of the cooling medium flow section from the cooling medium flow section toward the cooling device, the rotor including: a leading passage which leads the liquid phase cooling medium to a region which is in the vicinity of the cooling target through a first opening formed in a side surface of the cooling medium flow section, the side surface extending along the rotational axis; and a return passage which returns the gas phase cooling medium to the inside of the cooling medium flow section, the gas phase cooling medium being generated by evaporation of the liquid phase cooling medium in the region which is in the vicinity of the cooling target, by heat exchange between the liquid phase cooling medium and the cooling target.

In accordance with the above-described configuration, since the rotary machine includes the leading passage which leads the liquid phase cooling medium from the cooling medium flow section to the region which is in the vicinity of the cooling target, the cooling target can be directly cooled by use of the liquid phase cooling medium. This makes it possible to simplify or omit the structure of a heat conduction path. In addition, since the rotary machine includes the return passage as a path which returns to the cooling medium flow section, the gas phase cooling medium generated after cooling of the cooling target, separately from the leading passage which flows the liquid phase cooling medium therethrough, a liquid phase cooling medium flow passage and a gas phase cooling medium flow passage of a cooling medium circulating pipe (the leading passage or the return passage) inside the rotor can be separately provided, and the thermal transport capability of the cooling medium circulating pipe can be improved. Therefore, in accordance with this configuration, cooling efficiency can be increased while preventing an increase in the weight and cost of a rotor, even in a case where the diameter of the rotor is increased.

The return passage may be configured to return the gas phase cooling medium to the inside of the cooling medium flow section, through a second opening formed in a center portion of a side surface of one end portion of the cooling medium flow section in a direction of the rotational axis (rotational axis direction). In accordance with this configuration, since the second opening is formed in the center portion of the side surface of one end portion of the cooling medium flow section in the rotational axis direction, it becomes possible to prevent a situation in which the second opening is filled with the liquid phase cooling medium even in a state in which the liquid phase cooling medium is reserved in the cooling medium flow section at a certain level. Since the return passage is connected to the second opening, it becomes possible to secure all the time the path which returns the gas phase cooling medium to the inside of the cooling medium flow section.

The cooling target may include a plurality of cooling targets arranged in a circumferential direction of the rotational axis, the leading passage may be configured to lead the liquid phase cooling medium to regions which are in the vicinity of the plurality of cooling targets through first openings which are equal in number to the plurality of cooling targets, and the return passage may include a plurality of first passages which lead the gas phase cooling medium from the regions which are in the vicinity of the plurality of cooling targets to the center portion of the rotor in the radial direction, and a second passage extending along the rotational axis so that the plurality of first passages are collectively connected to the second opening via the second passage in the center portion of the rotor in the radial direction. In accordance with this configuration, the length of the rotor (cooling target) in the rotational axis direction can be set longer than the length of the cooling medium flow section (the size of the cooling medium flow section defining a central hollow space can be reduced). Therefore, it is not necessary to increase the size of the cooling structure according to the size of the rotor, and the material cost and the manufacturing cost can be reduced.

The return passage and the leading passage may constitute a double passage. In the configuration in which the double passage is constituted by the return passage and the leading passage, even in a case where one of the passages of the double passage is filled with the liquid phase cooling medium, the gas phase cooling medium can be returned to the cooling medium flow section through the other of the passages of the double passage.

A length of the cooling medium flow section in a direction of the rotational axis may be shorter than a length of the cooling target in the direction of the rotational axis. In accordance with this configuration, the length of the rotor (cooling target) in the rotational axis direction can be set longer than the length of the central hollow space. In other words, the size of the cooling medium flow section defining the central hollow space can be reduced. Therefore, it is not necessary to increase the size of the cooling structure according to the size of the rotor, and the material cost and the manufacturing cost can be reduced.

The rotor may include an ingress prevention section which prevents ingress of the liquid phase cooling medium from the cooling medium flow section into the return passage constituting the double passage together with the leading passage. In accordance with this configuration, since the ingress of the liquid phase cooling medium from the cooling medium flow section into the return passage is prevented, the cooling medium can be efficiently circulated. Specifically, the liquid phase cooling medium is efficiently delivered from the cooling medium flow section to the cooling target, and the gas phase cooling medium is efficiently returned from the cooling target to the cooling medium flow section.

The above and further objects, features and advantages of the present invention will more fully be apparent from the following detailed description of the preferred embodiments with reference to accompanying drawings.

Advantageous Effects of the Invention

The present invention has been configured as described above, and the present invention can obtain an advantage in that cooling efficiency can be increased while preventing an increase in the weight and cost of a rotor, even in a case where the diameter of the rotor is increased.

DESCRIPTION OF EMBODIMENTS

Hereinafter, the embodiments of the present invention will be described with reference to the drawings. Throughout the drawings, the same or corresponding constituents are designated by the same reference symbols and will not be described in repetition.

Embodiment 1

Figure 1:
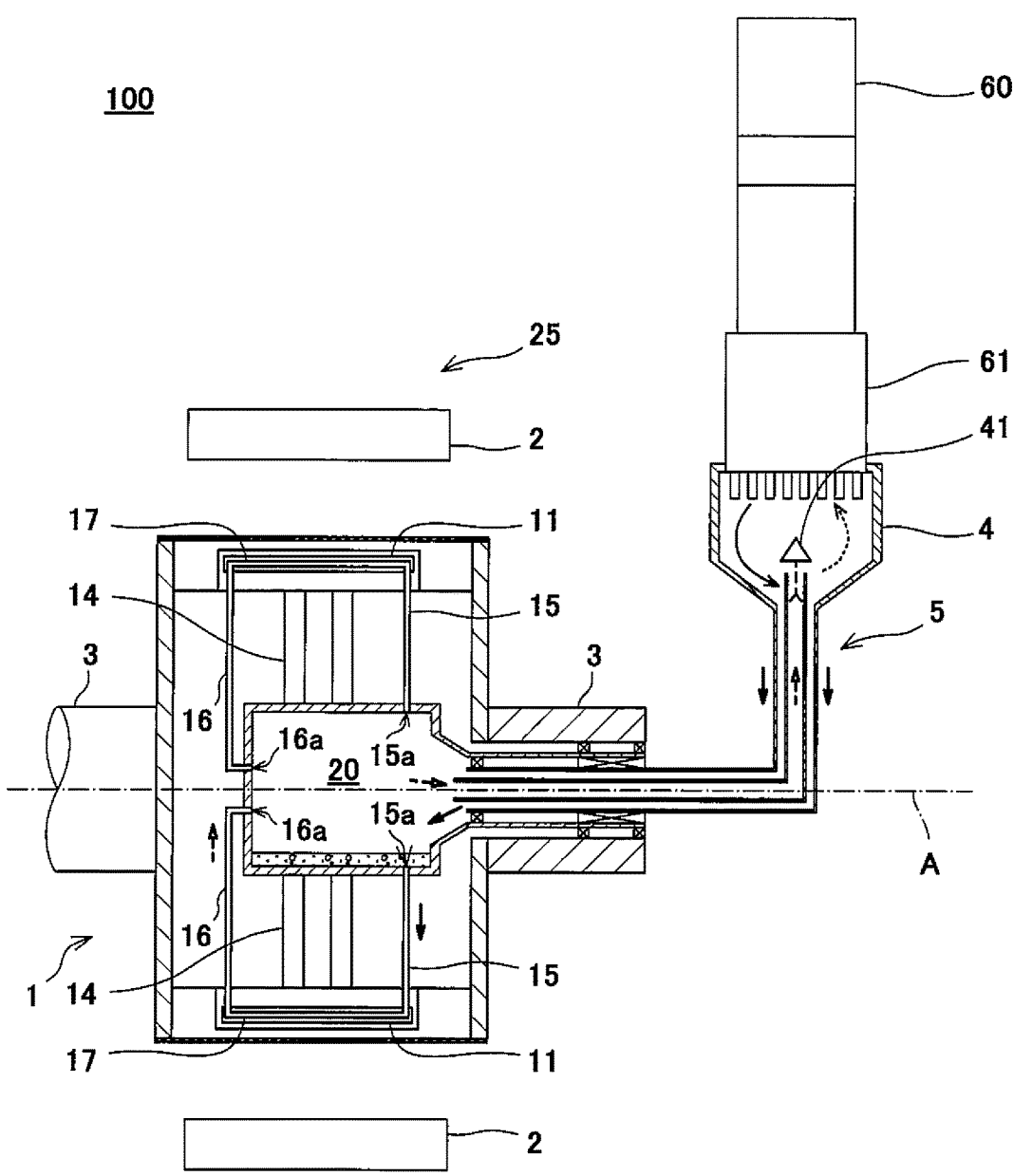
FIG. 1 is a schematic cross-sectional view of a rotary machine according to Embodiment 1 of the present invention, which is taken along a rotational axis.

FIG. 1 is a schematic cross-sectional view of a rotary machine according to Embodiment 1 of the present invention, which is taken along a rotational axis. As shown in FIG. 1, a rotary machine 100 according to the present embodiment includes a rotor 1 which is rotatable around a rotational axis A, and a cooling device 60. A stator 25 is provided around the rotor 1 (outward of the rotor 1 in a radial direction). A plurality of armatures 2 are arranged at equal intervals in a circumstantial direction. The rotor 1 includes a rotary shaft 3 and at least two field poles 11 provided outward of the rotary shaft 3 in the radial direction (disposed radially outward of the rotary shaft 3). In the present embodiment, a plurality of superconducting coils are arranged at equal intervals in the circumferential direction, as the field poles 11. The superconducting coils are constituted by, for example, high-temperature superconducting wires wound around winding cores.

Although in the present embodiment, the superconducting rotary machine will be described as an example of the rotary machine 100, the rotary machine 100 is not limited to this so long as the rotary machine 100 is a rotary machine having a structure for cooling a cooling target (target to be cooled) inside the rotor 1 which is rotatable around the rotational axis A. Therefore, the rotary machine 100 may include the rotor 1 including a permanent magnet, normal conduction coils, or the like, instead of the superconducting coils.

The critical temperature of the superconducting coils formed by the high-temperature superconducting wires is about 90 K. Therefore, the superconducting coils are cooled to about several K to several tens K by the cooling device 60. More, specifically, a liquid phase cooling medium generated by cooling and condensation in the cooling device 60 is introduced into the rotor 1, and evaporated into a gas phase cooling medium in regions which are in the vicinity of the field poles 11, by heat exchange between the liquid phase cooling medium and the field poles 11. In this way, the field poles 11 are cooled. Thus, in the present embodiment, the field poles 11 constituted by the superconducting coils are the cooling target. For example, a freezing (refrigerating)

device such, as a GM freezing (refrigerating) device is used as the cooling device 60. The cooling medium used herein may be a cooling medium such as neon or nitrogen, whose phase is changed from a liquid into a gas after cooling of the field poles 11.

The rotor 1 includes a hollow cooling medium flow section 20 formed in a center portion in the radial direction and extending along the rotational axis A. In other words, the rotor 1 is formed with a hollow space (central hollow space) which flows the cooling medium therethrough, in the center portion in the radial direction. The shape of the inner wall of the cooling medium flow section 20 may be a cylinder or a polygonal column. Or, the inner wall of the cooling medium flow section 20 may have fins. The field poles 11 which are the cooling target are disposed radially outward of the cooling medium flow section 20. The rotary machine 100 includes a stationary section pipe (pipe provided on a stationary section side) 5 which introduces the liquid phase cooling medium generated by cooling in the cooling device 60 into the cooling medium flow section 20, and which returns the gas phase cooling medium generated after cooling of the field poles 11 and present in the inside of the cooling medium flow section 20, from the cooling medium flow section 20 toward the cooling device 60.

The rotary machine 100 includes a condenser 4, the lower end portion of which is connected to the stationary section pipe 5 and which condenses the gas phase cooling medium returned through the stationary section pipe 5 into the liquid phase cooling medium. The condenser 4 includes a cold head section 61 cooled by the cooling device 60, at an upper portion of a container having a funnel-shaped lower portion. Thus, the stationary section pipe 5 thermally connects the field poles 11 which are the cooling target to the condenser 4.

The stationary section pipe 5 has, for example, a double-pipe structure in which the inner space of an inner pipe is a gas phase cooling medium passage, and a space formed between the inner pipe and an outer pipe surrounding the inner pipe is a liquid phase cooling medium passage. The condenser 4 includes in an inside thereof, an ingress prevention section 41 for preventing ingress of the liquid phase cooling medium into the gas phase cooling medium passage. For example, the ingress prevention section 41 has a conical umbrella structure provided at the upper end portion of the inner pipe of the stationary section pipe 5, with a horizontal space. This makes it possible to prevent the ingress of the liquid phase cooling medium generated by condensation in the condenser 4 into the gas phase cooling medium passage of the stationary section pipe 5.

The condenser 4 is disposed above the cooling medium flow section 20 in a state in which the rotary machine 100 is disposed with the rotational axis A of the rotor 1 oriented horizontally. In this arrangement, the liquid phase cooling medium generated by condensation in the condenser 4 is dropped naturally by a gravitational force and is introduced into the cooling medium flow section 20. The gas phase cooling medium generated after cooling of the field poles 11 and present in the inside of the cooling medium flow section 20 is returned from the cooling medium flow section 20 to the condenser 4 due to a pressure difference or a density difference generated inside the condenser 4, the stationary section pipe 5, and the cooling medium flow section 20, By providing the structure for allowing such a thermosiphon action (also referred to as a heat pipe action) to occur, the gas phase cooling medium is condensed into the liquid phase cooling medium in the condenser 4 and the liquid phase cooling medium is evaporated into the gas phase cooling medium, by heat exchange between the liquid phase cooling medium and the field poles (cooling target) 11 via the cooling medium flow section 20, by auto-circulation (natural convection) of the cooling medium between the condenser 4 and the rotor 1.

The rotor 1 includes leading passages 15 which lead the liquid phase cooling medium to regions which are in the vicinity of the field poles 11 which are the cooling target, through first openings 15a formed in a side surface of the cooling medium flow section 20, the side surface extending along the rotational axis A, and return passages 16 which return to the inside of the cooling medium flow section 20, the gas phase cooling medium generated by evaporation of the liquid phase cooling medium in the regions which are in the vicinity of the field poles 11, by heat exchange between the liquid phase cooling medium and the field poles 11. In the present embodiment, the return passages 16 are configured to return the gas phase cooling medium to the inside of the cooling medium flow section 20, through second openings 16a formed in a center portion of a side surface of one end portion of the cooling medium flow section 20 in a direction of the rotational axis A (rotational axis A direction). In addition, the rotary machine 1 includes relay passages 17 connecting the leading passages 15 and the return passages 16 to each other. The relay passages 17 may extend through regions which are in the vicinity of the superconducting coils which are the field poles 11, or may be configured to allow the cooling medium to directly reach the superconducting coils. The cross-sectional shapes of the leading passage 15, the return passage 16, and the relay passage 17 may be a circle or a polygon. Each of the leading passage 15, the return passage 16, and the relay passage 17 may be implemented by a pipe structure, or may be formed by cutting a solid portion (e.g., winding core holder, or the like) of the rotor 1.

In a normal use state of the rotary machine 100 which is between a state in which the rotational axis A extends in the horizontal direction and a state in which the rotational axis A is inclined (tilted) by a predetermined allowable movement/inclination (tilt) angle with respect to the horizontal direction, the liquid phase cooling medium introduced into the cooling medium flow section 20 flows downward (radially outward) by a gravitational force and a centrifugal force generated by rotation of the rotor 1 (the liquid phase cooling medium is reserved in the cooling medium flow section 20, depending on the case). Since the first openings 15a formed in the side surface of the cooling medium flow section 20, the side surface extending along the rotational axis A, are located downward (vertically downward) by the rotation of the rotor 1, the liquid phase cooling medium flows out of the cooling medium flow section 20 and into the leading passages 15 through the first openings 15a. Then, the liquid phase cooling medium is led to the relay passages 17 disposed in the regions which are in the vicinity of the field poles 11 and exchanges heat with the field poles 11. By this heat exchange, the field poles 11 are cooled to a specified temperature. The cooling medium (gas phase cooling medium) generated by the heat exchange is returned to the inside of the cooling medium flow section 20 through the return passages 16 and then through the second openings 16a formed in the center portion of the side surface of one end portion of the cooling medium flow section 20 along the rotational axis A direction.

In the present embodiment, the rotor 1 includes a heat conduction section 14 which is capable of conducting (transferring) heat between the cooling medium flow section 20 and the field poles 11. Each of the cooling medium flow section 20 and the heat conduction section 14 is formed of a heat conductive material. The heat conduction section 14 may be constituted by heat conduction (transfer) bars coupling the cooling medium flow section 20 to the field poles 11, as shown in FIG. 1. Or, the heat conduction section 14 may have a structure in which a winding core holder holding winding cores around which the superconducting coils constituting the field poles 11 are wound is made of a heat conductive material, and this winding core holder is in contact with the cooling medium flow section 20. In this structure, the field poles 11 are further cooled by indirect heat exchange between the field poles 11 and the liquid phase cooling medium which has flowed into the cooling medium flow section 20, via the cooling medium flow section 20 and the heat conduction section 14.

In accordance with the above-described configuration, since the rotary machine 100 includes the leading passages 15 which lead the liquid phase cooling medium from the cooling medium flow section 20 to the regions which are in the vicinity of the field poles 11 which are the cooling target, the field poles 11 can be directly cooled by use of the liquid phase cooling medium. This makes it possible to simplify or omit the structure of the heat conduction section 14. In addition, since the rotary machine 100 includes the return passages 16 as paths which return the gas phase cooling medium generated after cooling of the field poles 11, are provided separately from the leading passages 15 which flow the liquid phase cooling medium therethrough, the liquid phase cooling medium flow passage and the gas phase cooling medium flow passage of a cooling medium circulating pipe (the leading passages 15 or the return passages 16) inside the rotor 1 can be separated from each other, and the thermal transport capability of the cooling medium circulating pipe can be improved. Therefore, in accordance with the above-described configuration, cooling efficiency can be increased while preventing an increase in the weight and cost of the rotor 1, even in a case where the diameter of the rotor 1 is increased. This can easily realize the rotary machine 100 with a large size, having a rotor diameter of 1 to 3 m. Therefore, it can be expected that the rotary machine 100 can be used in a larger marine vessel (ship), a marine plant such as wind power generation facility on the ocean, etc.

Since the second openings 16a are formed in the center portion of the side surface of one end portion of the cooling medium flow section 20 in the rotational axis direction, it becomes possible to prevent a situation in which the second openings 16a are filled with the liquid phase cooling medium even in a state in which the liquid phase cooling medium is reserved in the cooling medium flow section 20 at a certain level. Since the return passages 16 are connected to the second openings 16a, it becomes possible to secure all the time the paths which return the gas phase cooling medium to the inside of the cooling medium flow section 20.

The leading passages 15 are configured to lead the liquid phase cooling medium from the inside of the cooling medium flow section 20 to the regions which are in the vicinity of the field poles 11, through the first openings 15a which are equal in number to the field poles 11. For example, in a case where the rotor 1 includes six field poles 11, six first openings 15a are provided at equal intervals in the circumferential direction, on the side surface of the cooling medium flow section 20, the side surface extending along the rotational axis A. Each of the first openings 15a is provided to face the corresponding field pole 11 in the radial direction. Each of the leading passages 15 is provided to extend along the radial direction, from the corresponding first opening 15a toward the corresponding field pole 11. Each of the return passages 16 extends along the radial direction from the corresponding one of the regions which are in the vicinity of the plurality of field poles 11 toward the center portion of the rotor 1 in the radial direction, and is connected to the corresponding second opening 16a. Therefore, the second openings 16a which are equal in number to the field poles 11 are provided at equal intervals in the circumferential direction, on a virtual circumference which is coaxial with the rotational axis A, in the center portion of the side surface of one end portion of the cooling medium flow section 20.

In accordance with this configuration, since the plurality of leading passages 15 which are equal in number to the field poles 11 are arranged radially, it becomes possible to efficiently transmit the liquid phase cooling medium to the regions which are in the vicinity of the field poles 11, by the centrifugal force generated by the rotation of the rotor 1 around the rotational axis A. Therefore, it becomes possible to form the cooling medium path having a simple structure and high heat transfer efficiency.

As described above, in the present embodiment, the rotary machine 100 has a structure in which the liquid phase cooling medium is led from the cooling medium flow section 20 to the regions which are in the vicinity of the field poles 11 through the leading passages 15 and the regions which are in the vicinity of the field poles 11 are directly cooled by the liquid phase cooling medium, and a structure in which the regions which are in the vicinity of the field poles 11 are indirectly cooled by the cooling medium flow section 20 and the heat conduction section 14. With these structures, for example, it becomes possible to perform initial starting occurring when the rotor 1 of the superconducting rotary machine 100 of the present embodiment shifts from a shut-down state to a rotating state, without providing a structure for performing the initial starting different from a superconducting action. After the rotor 1 has shifted to the rotating state, the liquid phase cooling medium is led to the field poles 11 through the leading passages 15 by the rotation of the rotor 1, and directly cools the field poles 11. Therefore, it is sufficient that the cooling capability provided by the heat conduction section 14 is limited. The structure of the heat conduction section 14 can be reduced in size and simplified.

Embodiment 2

Figure 2:
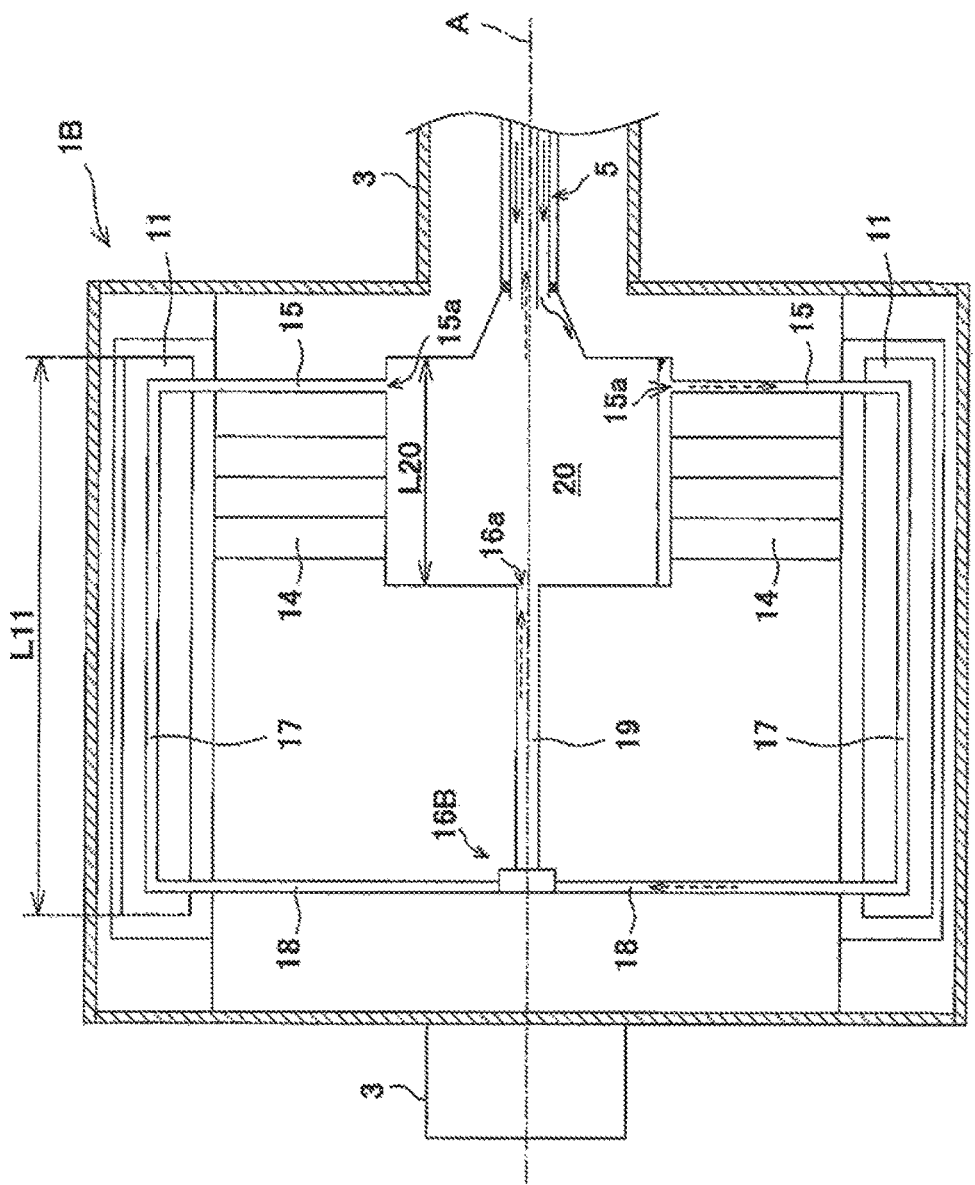
FIG. 2 is a schematic cross-sectional view of a rotor of a rotary machine according to Embodiment 2 of the present invention, which is taken along the rotational axis.

Hereinafter, a rotary machine according to Embodiment 2 of the present invention will be described. FIG. 2 is a schematic cross-sectional view of a rotor of the rotary machine according to Embodiment 2 of the present invention, which is taken along the rotational axis. In the present embodiment, the same constituents as those of Embodiment 1 are designated by the same reference numerals, and will not be described in repetition. As shown in FIG. 2, the rotary machine of the present embodiment is different from the rotary machine of Embodiment 1 in that a return passage 16B of a rotor 1B includes a plurality of first passages 18 which lead the gas phase cooling medium from the regions which are in the vicinity of the plurality of field poles 11 to a center portion of the rotor 1B in the radial direction, and a second passage 19 extending along the rotational axis A so that the plurality of first passages 18 are collectively connected to the second opening 16a via the second passage 19, in the center portion in the radial direction.

The first passages 18 are provided to extend along the radial direction, from the relay passages 17 provided in the field poles 11 toward the center portion of the rotor 1 in the radial direction. A first end portion of the second passage 19 is connected to the first passages 18 which are equal in number to the field poles 11, and a second end portion of the second passage 19 is connected to one second opening 16a formed in the center portion of the side surface of one end portion of the cooling medium flow section 20. The first passages 18 and the second passage 19 are formed by, for example, pipe structures.

Since the second passage 19 extending in the rotational axis A direction is provided, a length L20 of the cooling medium flow section 20 in the rotational axis A direction is shorter than a length L11 of the field poles 11 in the rotational axis A direction.

In accordance with this configuration, the length of the rotor 1 (and the field poles 11) in the rotational axis A direction can be set longer than the length of the cooling medium flow section 20. In other words, the size of the cooling medium flow section 20 can be reduced without reducing the cooling efficiency. Therefore, it is not necessary to increase the size of the cooling structure according to the size of the rotor 1, and the material cost and the manufacturing cost can be reduced. For example, the length L20 of the cooling medium flow section 20 in the rotational axis A direction is ⅔ or less of the length L11 of the field poles 11 in the rotational axis A direction.

Embodiment 3

Figure 3:
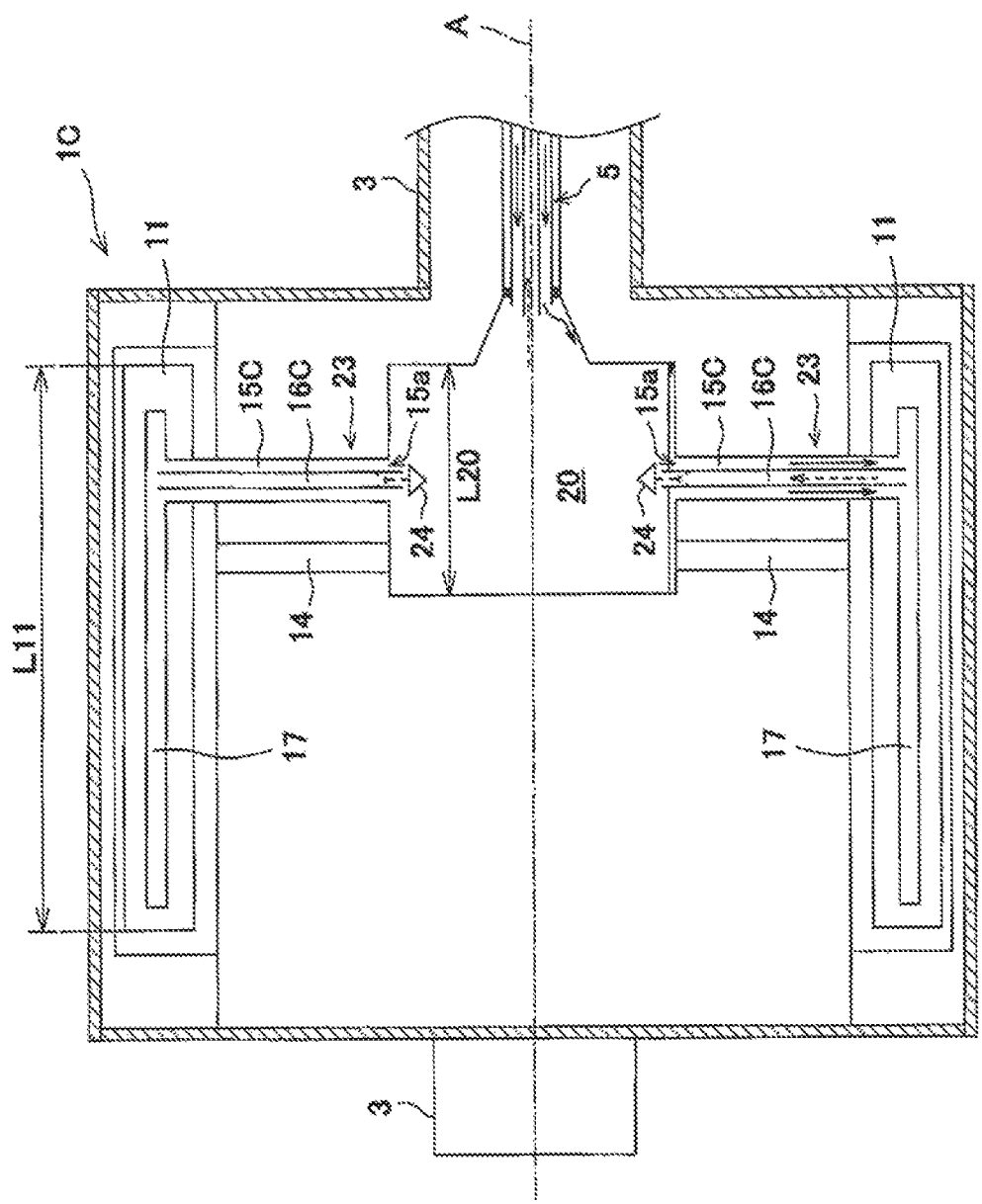
FIG. 3 is a schematic cross-sectional view of a rotor of a rotary machine according to Embodiment 3 of the present invention, which is taken along the rotational axis.

Hereinafter, a rotary machine according to Embodiment 3 of the present invention will be described. FIG. 3 is a schematic cross-sectional view of a rotor of the rotary machine according to Embodiment 3 of the present invention, which is taken along the rotational axis. In the present embodiment, the same constituents as those of Embodiment 1 are designated by the same reference numerals, and will not be described in repetition. As shown in FIG. 3, the rotary machine of the present embodiment is different from the rotary machine of Embodiment 1 in that each of return passages 16C of a rotor 1C constitutes a double passage 23, together with a leading passage 15C (the return passage 16C and the leading passage 15C constitute the double passage 23). Specifically, each of the return passages 16C is connected to the first opening 15a as in the leading passage 15C.

For example, of the double pipe constituting the double passage 23, a passage formed between an outer pipe and an inner pipe functions as the leading passage 15C which flows the liquid phase cooling medium therethrough, while an inner passage of the inner pipe functions as the return passage 16C which flows the gas phase cooling medium therethrough. Which of the passages should flow therethrough the liquid phase cooling medium or the gas phase cooling medium may not be determined in a strict sense, so long as the liquid phase cooling medium is led from the cooling medium flow section 20 to the relay passage 17 and the gas phase cooling medium is returned from the relay passage 17 to the inside of the cooling medium flow section 20.

In accordance with this configuration, the cooling medium passages formed between the cooling medium flow section 20 and the regions which are in the vicinity of the field poles 11 are the double passages 23. Therefore, even in a case where a part of one of the inner and outer passages (e.g., outer passage) of each of the double passages 23 is filled with the liquid phase cooling medium, the gas phase cooling medium can be returned to the cooling medium flow section 20 through the other of the inner and outer passages (e.g., inner passage).

Further, the rotor 1C of the present embodiment includes ingress prevention sections 24 for preventing the ingress of the liquid phase cooling medium from the cooling medium flow section 20 into the return passages 16C each constituting the double passage 23 together with the leading passage 15C. The ingress prevention sections 24 are provided at locations of the end portions of the inner pipes constituting the return passages 16C, the end portions being closer to the cooling medium flow section 20, where the ingress of the liquid phase cooling medium from the cooling medium flow section 20 into the inner pipe is prevented, and the flow of the gas phase cooling medium from the inner pipe into the cooling medium flow section 20 is not impeded. For example, each of the ingress prevention sections 24 is disposed in such a manner that a lateral opening is formed between the ingress prevention section 24 and the end portion of the inner pipe which is closer to the cooling medium flow section 20, and the ingress prevention section 24 covers the outer side of the inner pipe in a lengthwise direction (the inner side of the cooling medium flow section 20 in the radial direction). For example, the ingress prevention sections 24 have an umbrella shape such as cone.

By providing the ingress prevention section 24, it becomes possible to prevent the ingress of the liquid phase cooling medium from the cooling medium flow section 20 into the return passages 16C. Therefore, the cooling medium can be efficiently circulated. Specifically, the liquid phase cooling medium is efficiently delivered from the cooling medium flow section 20 to the field poles 11 as the cooling target, and the gas phase cooling medium is efficiently returned from the field poles 11 to the cooling medium flow section 20.

The leading passage 15C and the return passage 16C formed as the double passage 23 may be disposed coaxially, or in a state in which the center axis of the leading passage 15C and the center axis of the return passage 16C are deviated from each other. Further, a plurality of inner pipes may be provided inside a single outer pipe.

Although in the present embodiment, the first openings 15a are provided in the center portion of the cooling medium flow section 20 in the rotational axis A direction, this structure is exemplary. Although the end portion of the double passage 23 which is closer to the field winding 11 is connected to a first (one) end portion of the relay passage 17 (which is closer to the cooling device 60) extending in the rotational axis A direction, it may be connected a second (the other) end portion of the relay passage 17, or to a center portion of the relay passage 17. In the present embodiment, also, the length L20 of the cooling medium flow section 20 in the rotational axis A direction is shorter than (⅔ or less of) the length L11 of the field poles 11 in the rotational axis A direction, as in Embodiment 2.

Embodiment 4

Figure 4:
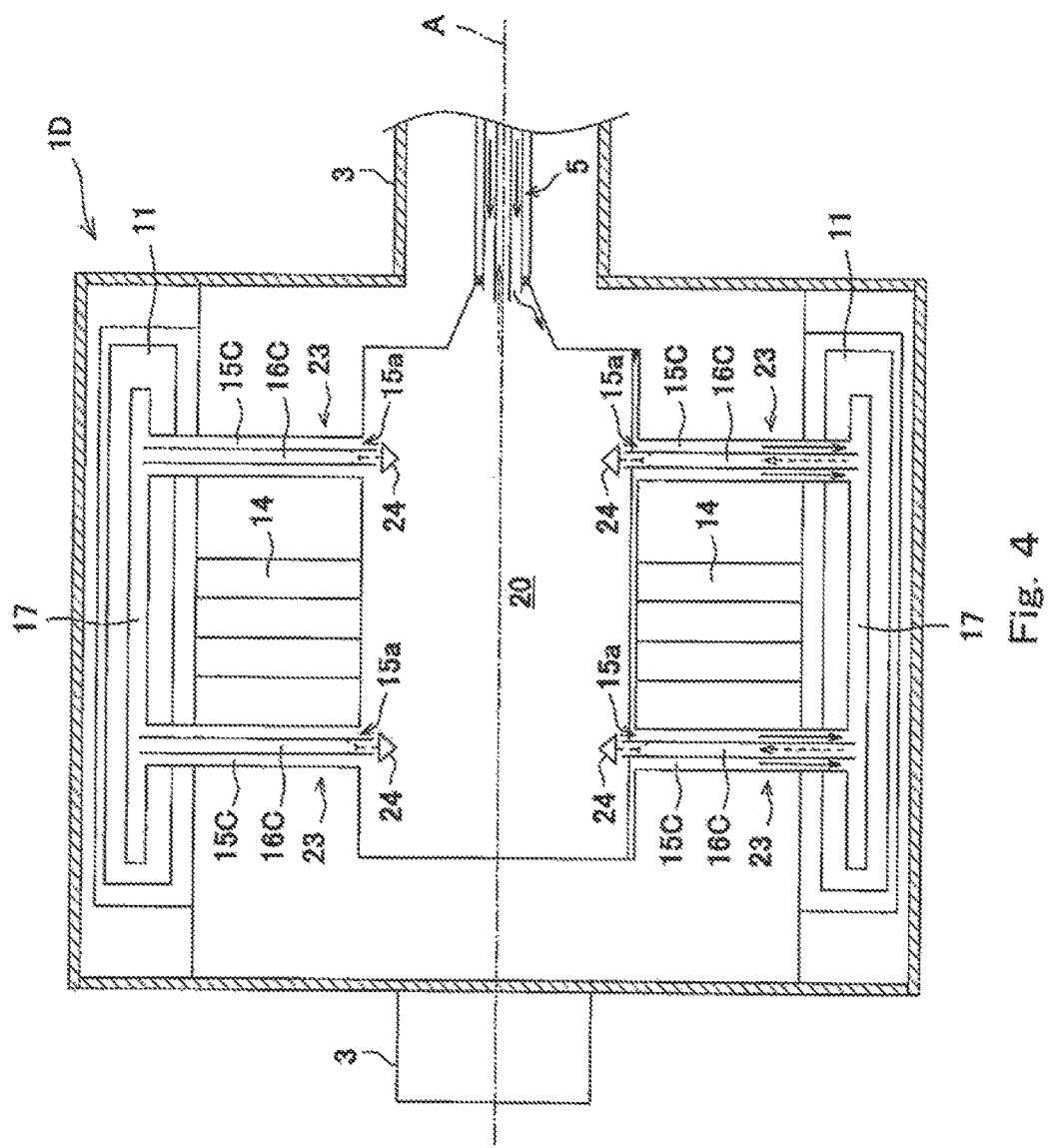
FIG. 4 is a schematic cross-sectional view of a rotor of a rotary machine according to Embodiment 4 of the present invention, which is taken along the rotational axis.

Hereinafter, a rotary machine according to Embodiment 4 of the present invention will be described. FIG. 4 is a schematic cross-sectional view of a rotor of the rotary machine according to Embodiment 4 of the present invention, which is taken along the rotational axis. In the present embodiment, the same constituents as those of Embodiment 3 are designated by the same reference numerals, and will not be described in repetition. As shown in FIG. 4, the rotary machine of the present embodiment is different from the rotary machine of Embodiment 3 in that a plurality of (two in the example of FIG. 4) double passages 23 of a rotor 1D are provided for each of the field poles 11 (a plurality of double passages 23 are provided to correspond to one field pole 11).

In the example of FIG. 4, two double passages 23 are provided for one field pole 11. Therefore, two first openings 15a are arranged in the rotational axis A direction. In this structure, the leading passages 15C and the return passages 16C are connected to one relay passage 17 at plural locations in the rotational axis A direction. Therefore, even in a configuration in which the length of the field poles 11 in the rotational axis A direction is large (the rotary machine 100 includes the rotor 1 with a large size), the whole of the field poles 11 can be efficiently cooled. Alternatively, three or more double passages 23 may be arranged in the rotational axis A direction.

The above-described embodiments are exemplary and the present invention is not limited to these. The present invention is defined by claims rather than the above-described scope. All changes can be made within meanings and scopes which are equivalent to the claims.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

For example, the constituents of the above-described plurality of embodiments may be combined as desired. For example, in Embodiment 1 and Embodiment 4, the length of the cooling medium flow section 20 in the rotational axis A direction may be set shorter than the length of the field poles 11 in the rotational axis A direction (the length of the field poles 11 may be set longer than the length of the cooling medium flow section 20) as in Embodiment 2 and Embodiment 3.

Although in the above-described embodiments, the superconducting rotary machine 100 includes the heat conduction section 14, the heat conduction section 14 may be omitted. In a case where the superconducting rotary machine 100 does not include the heat conduction section 14 and includes the field poles 11 constituted by the superconducting coils, constituents for allowing the superconducting rotary machine 100 to perform initial starting may be additionally provided. Furthermore, in a case where the heat conduction section 14 is omitted, the length L20 of the cooling medium flow section 20 in the rotational axis A direction may be ½ or less of the length L11 of the field poles 11 in the rotational axis A direction.

Although in the above-described embodiments, one field pole 11 is cooled by use of one leading passage 15, the plurality of field poles 11 may be alternatively cooled by use of one leading passage 15. For example, one leading passage 15 may be provided to correspond to the field poles 11 with a predetermined number which are arranged in the circumferential direction. In this case, one relay passage 17 may be configured to pass through in turn regions which are in the vicinity of the field poles 11 with the predetermined number. Alternatively, relay passages 17 with the predetermined number may branch from one leading passage 15 so that one relay passage 17 is provided for each of the field poles 11.

Although in the above-described embodiments, the return passage 16 is connected to the side surface of one end portion of the cooling medium flow section 20 in the rotational axis A direction, and the return passage 16 and the leading passage 15 constitute the double passage 23, these configurations of the leading passage 15 and the return passage 16 are exemplary. The leading passage 15 and the return passage 16 may be arranged in parallel. Specifically, both of the first opening 15a and the second opening 16a may be formed in the side surface of the cooling medium flow section 20, the side surface extending in the rotational axis A direction.

Although in the above-described embodiments, the cooling target is cooled by utilizing the natural convection of the cooling medium (based on the thermosiphon action and/or the heat pipe action), the natural convection of the cooling medium may not be used. In other words, leading of the liquid phase cooling medium and discharge of the gas phase cooling medium may be forcibly performed.

INDUSTRIAL APPLICABILITY

A rotary machine of the present invention is useful in increasing cooling efficiency while preventing an increase in the weight and cost of a rotor even in a case where the diameter of the rotor is increased.

REFERENCE SIGNS LIST 1, 1B, 1C, 1D rotor
5 stationary section pipe
11 field pole (cooling target)
15, 15C leading passage
15a first opening
16, 16B, 16C return passage
16a second, opening
18 first passage
19 second passage
20 cooling medium flow section
23 double passage
24 ingress prevention section
60 cooling device
100 rotary machine
A rotational axis

The invention claimed is:

1. A rotary machine including a rotor which is rotatable around a rotational axis, and a cooling device,
wherein the rotor includes:
a hollow cooling medium flow section provided in a center portion of the rotor in a radial direction and extending along the rotational axis; and
a cooling target provided outward of the cooling medium flow section in the radial direction,
the cooling medium flow section and the cooling target being spaced apart in the radial direction,
the rotary machine comprising:
a stationary section pipe which introduces a liquid phase cooling medium generated by cooling in the cooling device into the cooling medium flow section, and returns a gas phase cooling medium present in an inside of the cooling medium flow section from the cooling medium flow section toward the cooling device,
the rotor including:
a leading passage which leads the liquid phase cooling medium to a region which is in the vicinity of the cooling target through a first opening formed in a side surface of the cooling medium flow section, the side surface extending along the rotational axis; and
a return passage which returns the gas phase cooling medium to the inside of the cooling medium flow section, the gas phase cooling medium being generated by evaporation of the liquid phase cooling medium in the region which is in the vicinity of the cooling target, by heat exchange between the liquid phase cooling medium and the cooling target, wherein the return passage is configured to return the gas phase cooling medium to the inside of the cooling medium flow section, through a second opening formed in the cooling medium flow section and located inward of the first opening in the radial direction of the rotor.

2. The rotary machine according to claim 1,
wherein the second opening is formed in a center portion of a side surface of one end portion of the cooling medium flow section in a direction of the rotational axis.

3. The rotary machine according to claim 2,
wherein the cooling target includes a plurality of cooling targets arranged in a circumferential direction of the rotational axis,
wherein the leading passage is configured to lead the liquid phase cooling medium to regions which are in the vicinity of the plurality of cooling targets through first openings which are equal in number to the plurality of cooling targets, and
wherein the return passage includes a plurality of first passages which lead the gas phase cooling medium from the regions which are in the vicinity of the plurality of cooling targets to the center portion of the rotor in the radial direction, and a second passage extending along the rotational axis so that the plurality of first passages are collectively connected to the second opening via the second passage, in the center portion of the rotor in the radial direction.

4. The rotary machine according to claim 1,
wherein the return passage and the leading passage constitute a double passage.

5. The rotary machine according to claim 1,
wherein a length of the cooling medium flow section in a direction of the rotational axis is shorter than a length of the cooling target in the direction of the rotational axis.

6. The rotary machine according to claim 4,
wherein the rotor includes an ingress prevention section which prevents ingress of the liquid phase cooling medium from the cooling medium flow section into the return passage constituting the double passage together with the leading passage.

* * * * *